United States Patent [19]

Cameron et al.

[11] Patent Number: 4,687,421
[45] Date of Patent: Aug. 18, 1987

[54] FRANGIBLE PRESSURE RELIEF DISC ASSEMBLY AND POSITIVE DISPLACEMENT PUMPS CONTAINING THE DISC ASSEMBLY

[75] Inventors: Donald C. Cameron, Tulsa, Okla.; Paul M. Shireman, Westerville, Ohio

[73] Assignee: Dowell Schlumberger Incorporated, Tulsa, Okla.

[21] Appl. No.: 778,352

[22] Filed: Sep. 20, 1985

Related U.S. Application Data

[63] Continuation of Ser. No. 447,068, Dec. 6, 1982, abandoned.

[51] Int. Cl.⁴ ............................................. F04B 49/00
[52] U.S. Cl. ..................................... 417/296; 137/71; 137/543.21; 137/543.23; 417/568
[58] Field of Search ............... 137/71, 543.17, 543.19, 137/543.21, 543.23, 542, 797; 417/296, 568, 559, 563, 539

[56] References Cited

U.S. PATENT DOCUMENTS

| | | | |
|---|---|---|---|
| 1,571,022 | 1/1926 | Obert | 137/71 |
| 2,236,564 | 4/1941 | Cornell | 137/71 |
| 3,053,500 | 9/1962 | Atkinson | 137/543.23 |
| 3,291,054 | 12/1966 | McKenzie | 417/296 |
| 3,513,872 | 5/1970 | Tupper et al. | 137/543.19 X |
| 3,693,644 | 9/1972 | Dilorenzo | 137/71 |
| 3,760,694 | 9/1973 | Lieb | 417/539 X |
| 3,967,679 | 7/1976 | Liljestrand | 137/71 X |

Primary Examiner—Edward K. Look
Attorney, Agent, or Firm—David B. Deioma; L. Wayne White

[57] ABSTRACT

A frangible pressure relief disc assembly is disclosed which is adapted to fit into a positive displacement pump on the suction side of each cylinder. The disc assembly provides a pressure relief when the fluid passing through the pump encounters a closed valve or other obstruction in the line. The disc assembly comprises: (a) a support member having a first side and a second side which is penetrated by a passage (e.g., a bore) providing fluid communication from the first side to the second side, and (b) a pressure frangible disc fixedly attached to the support member and positioned to form a fluid-tight seal covering the passage.

4 Claims, 5 Drawing Figures

FRANGIBLE PRESSURE RELIEF DISC ASSEMBLY AND POSITIVE DISPLACEMENT PUMPS CONTAINING THE DISC ASSEMBLY

CROSS-REFERENCE TO RELATED APPLICATION

This is a continuation of application Ser. No. 447,068, filed 12/6/82 now abandoned.

BACKGROUND OF THE INVENTION

This invention pertains to a novel pressure relief disc assembly which is useful as a safety valve when it is in operative communication with a positive displacement pump.

Positive displacement pumps are widly used items of commerce. Such pumps have a power source driving at least one piston (and usually an odd number of pistons) in a reciprocating path within the confines of a cylinder. The piston(s) usually are connected to the power source by way of a crankshaft or camchaft. In opeation, the reciprocating piston in a positive displacement pump alternately creates a vacuum (on the backstroke) and a pressure (on the forward stroke) within the cylinder and any chamber in fluid communication with the cylinder. This principle is utilized to draw fluids into the cylinder chamber through an inlet port while the piston makes its back stroke by suction (vacuum) and to discharge the fluids from the cylinder chamber through an outlet port while the piston makes its forward stroke by pressure. The flow of fluids through the inlet and outlet ports are usually controlled by operation of certain valves movably seated in each of these ports, which are pressure actuated. If the positive displacement pump has more than one cylinder, then the movement of the reciprocating pistons are usually timed by operation of the camshaft or crankshaft so as to provide a uniform flow of fluids through the pump at a substantially constant pressure.

Usually the fluid pulled into the positive displacement pump is from a common fluid reservoir located on the "suction side" of the pump. Likewise, the fluid discharged is usually discharged into a common reservoir or conduit located on the "discharge side" or "pressure side" of the pump.

Positive displacement pumps are quite efficient and operate essentially trouble-free in most instances. However, a severe safety problem can (and does) occur when the fluid is discharged from the pump into a closed vessel or conduit. This occurs, for example, when the fluid is pumped against a closed valve in the conduit. In such instance, the pressure build-up is dramatic and can result in a catastrophic rupture of the pump, the conduit, and/or the receiving vessel. Others have attempted to alleviate this problem by placing pressure sensitive "pop valves" and the like on the conduit or vessel and external to the workings of the pump. While such pop valves may be effective to prevent rupture of the system, they pose another safety problem when the release. Namely, a stream of pressurized fluid is released to the surroundings through the ruptured pop valve which can cause injury to personnel in the surrounding area.

Accordingly, a need exists for a new type of pressure relief device for use in communication with a positive displacement pump that can effectively protect personnel and equipment when the pressure side of the pump system is closed or blocked. Such a device has now been discovered.

SUMMARY OF THE INVENTION

A novel frangible pressure relief disc assembly has been discovered which is uniquely effective in preventing catastrophic rupture of positive displacement pumps and equipment located on the pressure side of such pumps. The new disc assembly comprises:

(a) a support member having a first side and a second side which is penetrated by a passage providing fluid communication from said first side to said second side, and (b) a pressure frangible disc fixedly attached to said support member and positioned to form a fluid-tight seal covering said passage.

The new disc assembly is advantageously located in each cylinder of the positive displacement pump in fluid communication with the cylinder chamber and the fluid reservoir from which the fluid is being pumped. When the new disc assembly is positioned in this manner, the fluid merely circulates from the fluid reservoir into the cylinder chamber and back into the fluid reservoir when the frangible disc ruptures. The new disc assembly is most useful when used as a pressure actuated, valve movably seated, in the inlet port of each cylinder of a displacement pump to control the flow of fluids into the cylinder chamber; when used in this manner, the disc assembly services a dual role and facilitates pump assembly and preservation of space.

The novel disc assembly will be further understood by reference to the attached drawings and the following explanation thereof:

BRIEF DESCRIPTION OF THE DRAWINGS

FIG. 3 also shows spacing means depicted as a plurality of rigid legs (9) of essentially uniform length fixedly attached to the first side of the support member. The upper portions of the rigid legs and the support member jointly define a region of concave configuration penetrated by a passage. The disc assembly depicted by FIG. 3 also contains a gasket member (8) which is in contact with the first side of the support member and positioned such that the passage is not sealed by the gasket member.

FIG. 4 further illustrates the spring attachment means (7) from FIG. 3 and such means are shown as a plurality of blades whose tips extend radially outward from a center in a symmetrical pattern.

Conventional electronic and/or mechanical means can be used to show that fluids are no longer being pumped through the positive displacement pump and to automatically shut the pump off or to alert the operator of a malfunction. The ruptured frangible disc assembly(ies) in the pump can then be replaced. FIG. 5 shows the cylinder head (11) as containing a removable component (13) which serves jointly as a spring restraining means against which the disc assembly operates and as a means providing access to the cylinder chamber and the disc assembly. Such a removable component is optional, but advantageous.

EXPERIMENTAL

Figure 1:
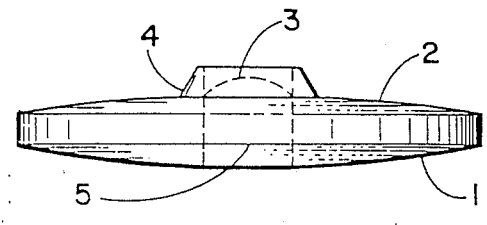
FIG. 1 is a schematic side view showing the disc assembly as a support member having a first side (1), a second side (2), a pressure frangible disc member (3) shown as a sphere segment which is held in position (i.e. fixedly attached to the support member) by a sealing member (4) to form a fluid-tight seal covering a passage (5). The passage provides for fluid communication between the first and second sides of the support member.
Figure 2:
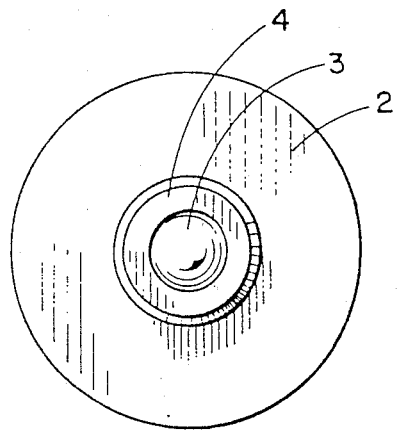
FIG. 2 is a schematic top view of the disc assembly illustrated by FIG. 1.
Figure 3:
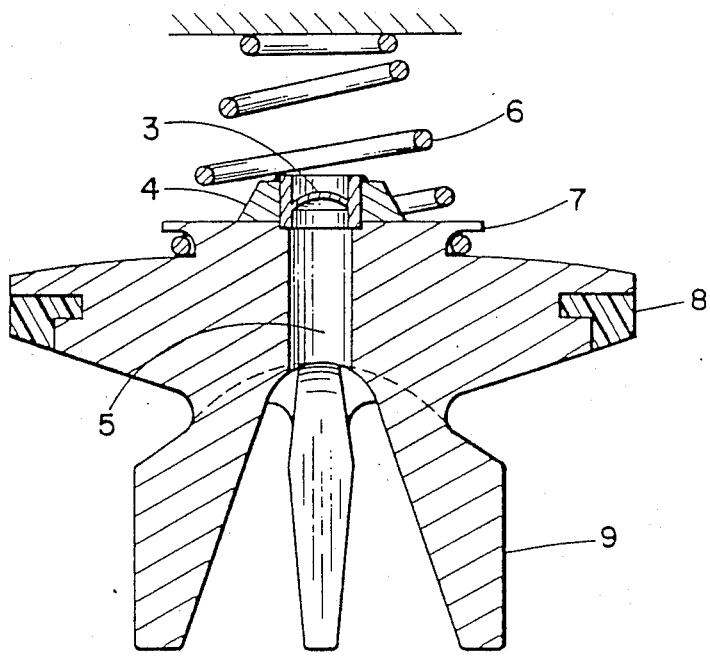
FIG. 3 is a schematic side view of the disc assembly having a spring (6) positioned in contact with the second side of the support member and held in place by spring attachment means (7).
Figure 4:
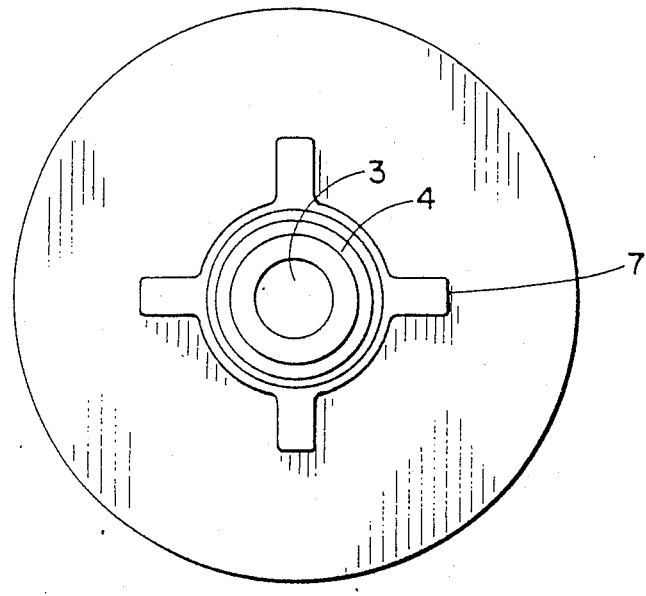
FIG. 4 is a schematic top view of the disc assembly shown in FIG. 3. The pressure frangible disc member (3) is held in place to form a fluid tight seal by a sealing member (4). The sealing member can be a one piece unit or a multiple piece unit, whichever is more convenient to the user. It has been found economical when the passage is a borehole and the frangible member is a sphere segment, to use a seat in the disc assembly having a bore diameter larger than, but approximately the same as, the diameter of the base of the frangible member to thereby restrain lateral movement of the frangible member positioned within said bore. The sealing member has at its top (FIG. 3) a restraining member having a bore with a diameter smaller than the diameter of the base of the frangible member sphere segment, the restraining member being in contact with said frangible member. The restraining member of the sealing member (4) and the seat being positioned such that their bores are in coaxial alignment.
Figure 5:
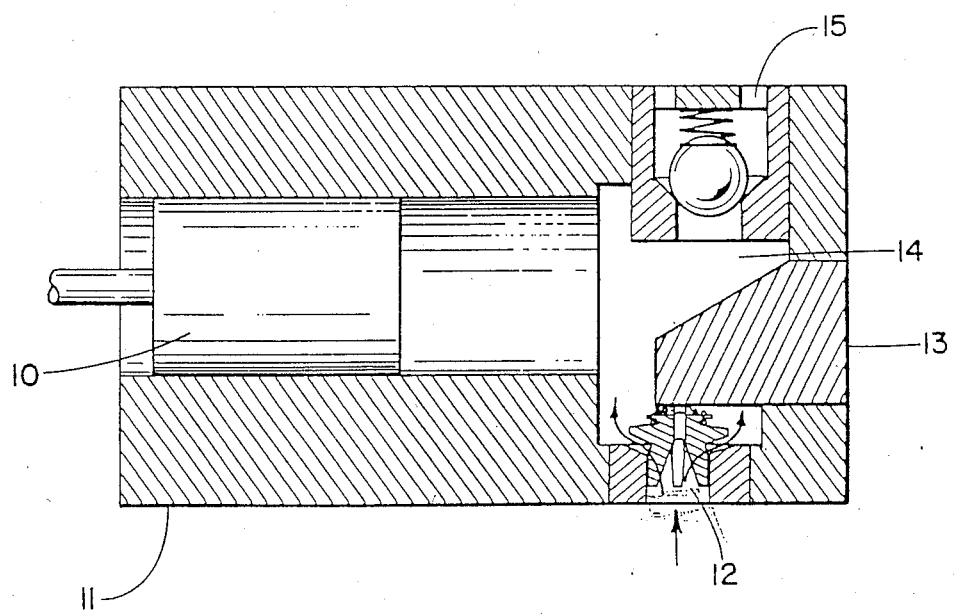
FIG. 5 is a schematic cross-section of a cylinder (11) in a positive displacement pump having the disc assembly from FIG. 3 positioned in its inlet port (12) and serving a dual function: as a check valve controlling the flow of fluids into the cylinder during operation and as an internal safety valve. As shown, the disc assembly is a pressure actuated valve which is movably seated within the inlet port of the cylinder. When the piston (10) makes its backstroke, it creates a vacuum (suction) within the cylinder chamber (14) and the pressure differential between the cylinder chamber and atmospheric pressure causes fluids in fluid communication with the inlet port to unseat the disc assembly/check valve and enter the cylinder chamber. When the piston starts its forward stroke, the pressure within the cylinder becomes a positive pressure and the compressed spring (6) on the disc assembly/check valve forces it to reseat. The fluids are then routinely discharged through a check valve in the outlet port (15). However, if the configuration of the equipment causes the piston to generate pressure on the fluid in the cylinder chamber exceeding the burst pressure of the frangible member (3) in the disc assembly (e.g. pumping agaist a closed valve), then the frangible will rupture and the fluid in the cylinder chamber will be discharged back through the inlet port into the fluid reservoir on the section side of the pump. If the pump continues to operate after the frangible is broken, the pump will merely recycle the fluid in the fluid reservoir.

A commercial positive displacement pump having three cdylinders was modified so that each cylinder contained a disc assembly (as shown in FIG. 3) in its inlet port (as shown in FIG. 5). Each disc assembly contained a frangible membrane designed to rupture at about 9500 psi, a pressure well below the pressure limit of the pump and associated hardware. The pump was started and used for several hours to pump water at elevated pressures and flow rates from one reservoir to another. The pump operated at its designated capacity without failure and the disc assembly worked well as an internal check valve. After this feature had been established, a valve was closed in the conduit on the discharge side of the pump. Each frangible proceeded to immediately rupture on the forward stroke of each piston at the designed rupture pressure the frangible and thereafter the water circulated harmlessly from the first water reservoir into the pump and back again.

Similar results were obtained when the positive displacement pump, containing the disc assembly units, was used to pump a cement slurry at elevated pressures and flow rates. No undue erosion was observed and the disc ruptured at the designed pressure when a valve on the discharge side of the pump was closed.

While the invention has been described and explained by reference to certain embodiments which are presently preferred, it will be apparent to the skilled artisan that various modifications can be made. Therefore, the invention is not limited to the embodiments shown.

What is claimed is:

1. A high-pressure positive displacement pump having a vacuum and pressure stroke having a combination safety and check valve comprising:

at least one cylinder having a bore therein, a piston mounted in the bore for fluidtight reciprocal motion and adapted to be connected to a power source;

a chamber in fluid communication with the cylinder, the chamber having a fluid inlet and fluid outlet means;

the fluid outlet including an outlet aperture in the chamber, a seat and resiliently mounted outlet valve normally biased shut but open during the pressure stroke;

the fluid inlet means including an inlet aperture in the chamber, a seat and a resiliently mounted combination check and safety valve normally biased shut but open during the vacuum stroke;

the combination check and safety valve including a support member adapted to withstand the high operating pressures having a first side and second side, the first side of the support member having a shape adapted to sit in fluidtight communication on the seat of the inlet aperture, a passageway in the support member providing fluid communication between the first and the second side, a sphere segment pressure frangible disc attached to the support member and positioned to form a fluidtight seal covering the passageway, said frangible disc having its convex side facing toward the chamber and staying in a fluidtight position during the high operating pressures of the pump but rupturing when the pump exceeds the operating pressures, thereby lowering the pressure in the system below its operating pressure until the frangible disc is replaced, thus protecting the pump and allowing high pressure fluid to be released through the passageway in the support member through the inlet aperture and into a fluid reservoir without venting it into the environment outside of the pump and its fluid system;

spacing means operatively attached to one side of the support member to hold it in position relative to the fluid inlet means; and biasing means operatively attached to one side of the support means for holding the combination check and safety valve in a normally closed position.

2. The high-pressure positive displacement pump of claim 1, wherein the spacing means includes a plurality of legs of essentially uniform length and symmetrically disposed which are fixedly attached to the first side of the support member and move along the walls of the fluid inlet.

3. A high-pressure positive displacement pump of claim 1, wherein there is a gasket member in contact with the first side of the support member.

4. A high-pressure positive displacement pump of claim 1, wherein there is a sealing member around the frangible disc and in contact with a support member.

* * * * *